J. N. RICE.
POWER ATTACHMENT FOR AUTOMOBILES.
APPLICATION FILED SEPT. 12, 1918.

1,307,269.

Patented June 17, 1919.

WITNESSES
GL Waring
U. B. Hillyard.

Inventor
John N. Rice
By Richard Blewer
Attorney

UNITED STATES PATENT OFFICE.

JOHN N. RICE, OF PONCA CITY, OKLAHOMA.

POWER ATTACHMENT FOR AUTOMOBILES.

1,307,269.   Specification of Letters Patent.   Patented June 17, 1919.

Application filed September 12, 1918.   Serial No. 253,785.

*To all whom it may concern:*

Be it known that I, JOHN N. RICE, a citizen of the United States, residing at Ponca City, in the county of Kay and State of Oklahoma, have invented certain new and useful Improvements in Power Attachments for Automobiles, of which the following is a specification.

The invention provides means whereby an automobile or motor vehicle of any type may be utilized as a power plant for driving any machinery to be operated either on a farm or other place where a stationary engine cannot be advantageously and economically employed.

The invention particularly aims to provide means whereby a farmer may utilize a motor vehicle as means for driving a thresher, mill, or other machinery desired to be operated periodically for performing the different work incident to farm industry.

The invention also aims to provide a device which enables the motor of an automobile, or motor vehicle, to be utilized as a power plant for driving any machinery to be operated periodically and which cannot be advantageously and economically driven by a special engine either of the stationary or portable type.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the accompanying drawings:—

Corresponding and like parts are referred to in the following description and indicated in the several views of the drawing by like reference characters.

Figure 1:
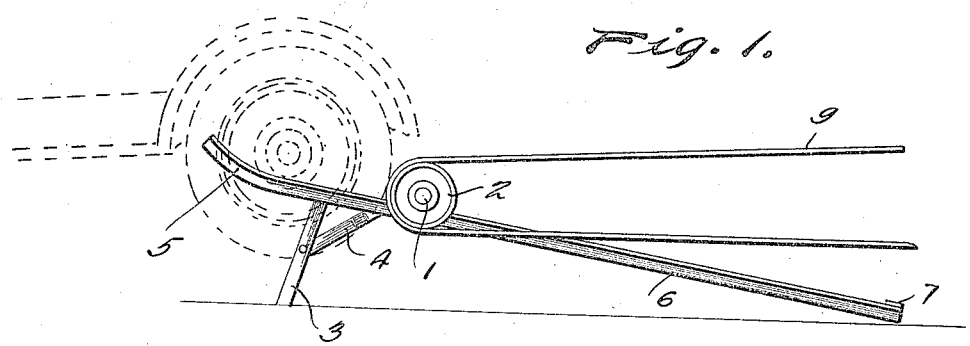
Figure 1 is a side view showing the invention in operative position.
Figure 2:
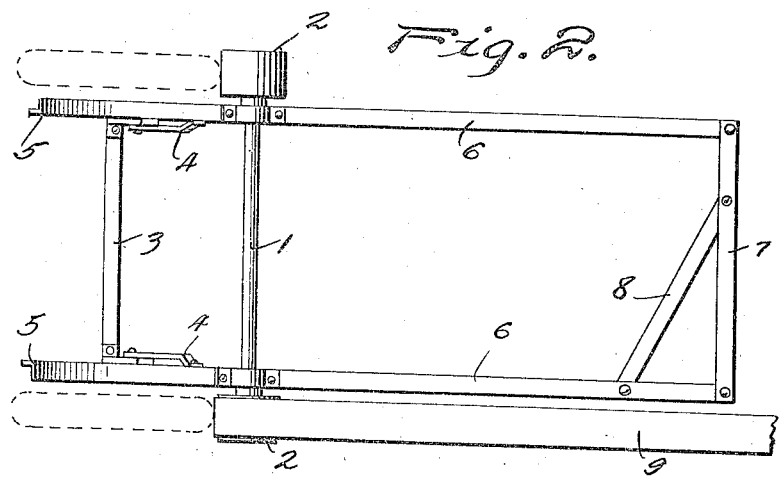
Fig. 2 is a top plan view of the part illustrated in Fig. 1.
Figure 3:
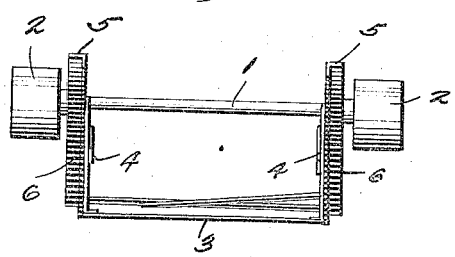
Fig. 3 is a rear view of the device.

The device comprises a suitable frame upon which is mounted a shaft 1 having pulleys 2 at its ends. The frame may be of any dimensions and construction and is provided near one end with a leg support 3, which is strengthened by means of a brace, or stays 4. One end of the frame curves upwardly, as indicated at 5, the purpose being to prevent disengagement of the parts when the device is in operative position as indicated most clearly in Fig. 1. As indicated the frame, or body of the device, comprises longitudinal bars 6 which are connected transversely by means of the leg support 3 and a cross piece 7. A brace 8 preserves the shape of the frame. The leg support 3 may be of any height and construction and may fold, thereby admitting of the device being reduced to a small space for storing and convenience of handling. The leg support 3 is located near one end of the frame and the latter is adapted to tilt thereon to admit of the curved end of the frame being raised or lowered as required.

The shaft 1 is disposed transversely and is mounted in bearings provided on the side bars 6. The ends of the shaft project beyond the side bars 6 and receive the pulleys 2 which are secured thereto in any manner. When the device is in operative position the curved ends of the frame extend beneath the rear axle of an automobile or other type of motor vehicle, a portion of the latter being indicated by dotted lines in Fig. 1. The relation and disposition of the parts are such that when the device is in operative position the frame inclines to the horizontal and the rear portion of the automobile is elevated and is supported by the frame in elevated position. The tendency of the automobile is to gravitate and move forwardly on the frame and this tendency is overcome by the rear or drive wheels of the machine coming in contact with the pulleys 2. It will thus be understood that the inclination of the frame combined with the weight of the machine results in maintaining contact between the drive wheels of the machine and the pulleys 2. The leg support 3 is disposed in such relative position as to insure the relationship of the parts about as indicated in Fig. 1, so that the frame of the device will maintain its inclined position and the rear portion of the machine will be held elevated. The curved end 5 of the frame prevents accidental disengagement of the frame from the axle and insures effective and positive manipulation of the parts when placing the device in position, or removing it from the machine when not required for immediate service.

It is to be understood that when the device is in position and the drive wheels of the automobile, or other motor vehicle, are set in motion the shaft 1 is driven and power may be taken from the shaft 1 in any manner for operating the machinery to be driven. As shown a drive belt 9 is employed the same engaging one of the pulleys 2.

It will be understood that the invention enables a farmer to utilize an automobile, or motor vehicle, as a power plant for driving any machinery required to be motor driven. Such machinery is required to be operated at certain periods only, therefore, it is not advantageous or economical to provide a special engine for the purpose, hence, the advantage of utilizing an automobile or motor vehicle in this capacity.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. Means for utilizing a motor vehicle in the capacity of a power plant the same comprising a frame having a leg support intermediate of its ends for tiltingly supporting the frame, a shaft mounted transversely on the frame, and pulleys secured to the shaft and adapted to be engaged by the drive wheels of a motor vehicle when the latter is supported in elevated position by means of the frame.

2. Means to enable a motor vehicle to be used as a power plant to drive machinery to be operated, the same comprising a frame having its front end upwardly curved and provided with a leg support which tiltingly supports the frame, a transverse shaft mounted on the frame in the rear of the leg support, and pulleys secured to the ends of the shaft and adapted to engage the drive wheels of the machine to be operated thereby.

In testimony whereof I affix my signature in presence of two witnesses.

JOHN N. RICE.

Witnesses:
J. M. HARMON,
EUGENE WETZEL.

Copies of this patent may be obtained for five cents each, by addressing the "Commissioner of Patents, Washington, D. C."